US006822032B2

(12) United States Patent
Gallucci

(10) Patent No.: US 6,822,032 B2
(45) Date of Patent: Nov. 23, 2004

(54) IMPACT MODIFIED COMPOSITIONS OF POLYIMIDE AND POLYAMIDE RESINS

(75) Inventor: Robert R. Gallucci, Mt. Vernon, IN (US)

(73) Assignee: General Electric Company, Pittsfield, MA (US)

(*) Notice: Subject to any disclaimer, the term of this patent is extended or adjusted under 35 U.S.C. 154(b) by 0 days.

(21) Appl. No.: 10/361,722

(22) Filed: Feb. 6, 2003

(65) Prior Publication Data

US 2004/0157996 A1 Aug. 12, 2004

(51) Int. Cl.⁷ ............................ C08L 77/00; C08L 79/08
(52) U.S. Cl. .................... 524/413; 524/448; 524/449; 524/451; 524/514; 525/180; 525/183
(58) Field of Search ................. 525/180, 183; 524/449, 448, 451, 413, 514

(56) References Cited

U.S. PATENT DOCUMENTS

| 3,803,085 A | 4/1974 | Takehoshi et al. ............ 528/26 |
| 3,814,869 A | 6/1974 | De Luca ....................... 379/21 |
| 3,847,867 A | 11/1974 | Heath et al. .................. 528/26 |
| 3,850,885 A | 11/1974 | Takekoshi et al. ........... 528/170 |
| 3,852,242 A | 12/1974 | White ......................... 528/170 |
| 3,855,178 A | 12/1974 | White et al. ................. 524/392 |
| 3,905,942 A | 9/1975 | Takekoshi et al. ........... 528/179 |
| 3,972,902 A | 8/1976 | Heath et al. ................. 549/241 |
| 3,983,093 A | 9/1976 | Williams, III et al. ....... 528/128 |
| 4,443,591 A | 4/1984 | Schmidt et al. ............. 528/128 |
| 4,455,410 A | 6/1984 | Giles, Jr. .................... 525/436 |
| 4,612,353 A | 9/1986 | Andrews et al. |
| 4,657,897 A | 4/1987 | Bristol et al. |
| 4,657,987 A | 4/1987 | Rock et al. .................. 525/432 |
| 5,013,799 A | 5/1991 | Giles, Jr. et al. |
| 5,126,407 A | 6/1992 | Subramanian ............... 525/179 |
| 5,780,576 A | 7/1998 | Weber et al. ................ 528/310 |

FOREIGN PATENT DOCUMENTS

| EP | 0 104 659 B1 | | 1/1988 |
| EP | 0 410 514 A1 | | 1/1991 |
| JP | 59025836 | * | 2/1984 |
| JP | 4-80248 | * | 3/1992 |

OTHER PUBLICATIONS

Lee, Lee, Choi, Liu, Polymer Journal, 30(7) pp531–537 (1998); Morphology and Dynamic Mechanical Properties of Nylon 66/Poly (ether imide) Blends.

Choi, Lee, Lee, Polymer Engineering and Science, 35 (2) 1643–1651 (1995); Crystallization and Melting Behavior of Nylon 66/Poly (ether imide) Blends.

* cited by examiner

Primary Examiner—Ana Woodward

(57) ABSTRACT

Blends of polyimide resins and polyamide show improved physical properties with the addition of rubbery olefinic resins containing zinc carboxylate moieties.

10 Claims, No Drawings

IMPACT MODIFIED COMPOSITIONS OF POLYIMIDE AND POLYAMIDE RESINS

FIELD OF THE INVENTION

This invention generally relates to impact modification of blends containing polyimides and polyamides using olefinic copolymers containing zinc carboxylate moieties.

BACKGROUND OF THE INVENTION

Blends of polyimide resins (PI) and polyamide resins (PA) (sometimes referred to herein as "PI/PA blends") possess various useful properties and are described in U.S. Pat. Nos. 5,013,799 and 4,657,897 and European Patent 0 104 659 B1. These polymer blends afford combined performance features not generally observed in the individual resins. The polyamide resins (also known as nylon resins) improves PI melt processability and solvent resistance while the PI resin improves the dimensional stability of the PA. While PI/PA blends have many useful features their practical impact is too low for many applications European Patent Appl. 0 410 514 A1 discloses use of a either (a) compound having both an ethylenically unsaturated carbon-carbon double bond and a carboxylic acid, acid anhydride, acid amide, imido, carboxylic acid ester, amino or hydroxyl group or (b) an epoxy compound and 0 to 40 parts by weight of a rubber polymer. The compositions are described as reducing the notch sensitivity and brittleness of PI/PA blends. However, there still exists a need to modify PI/PA blends to improve practical toughness while still having good appearance and melt stability to allow the blends to be formed into parts without significant decomposition of any of the components of the blends.

DESCRIPTION OF THE INVENTION

The present inventor has unexpectedly found that the use of rubbery olefinic copolymers containing zinc carboxylate moieties resulted in PI/PA blends having good appearance, good melt stability and improved impact resistance. Surprisingly, the use of a very similar olefin copolymer containing sodium carboxylate moieties did not result in the same improvements to properties of PI/PA blends as olefinic copolymers containing zinc carboxylate moieties. The zinc carboxylate containing copolymers of the present invention are substantially free of carbon-carbon double bonds. By "substantially free of carbon-carbon double bonds" is meant olefinic copolymers containing less than one mole % olefinic groups In a preferred embodiment of the invention, the compositions and articles thereof contain three major components: polyimide resin(s), polyamide resin(s) and olefinic copolymer(s) containing zinc carboxylate moieties and may further optionally contain one or more of antioxidants, stabilizers, lubricants, pigments, dyes, modifying agents, fillers, and reinforcing agents.

In another embodiment, the compositions and articles of the present invention are free of the modifying mixtures as described in European Patent Appl. 0 410 514 A1 which are based on low molecular weight compounds containing unsaturated carboxylic acids, anhydrides, acid amide, imido, carboxylic ester, amino, hydroxy, or epoxy compounds.

Useful thermoplastic poly(imide) resins have the general formula (I)

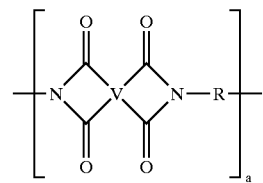

wherein a is more than about 10, typically 10 to about 1000 or more, and preferably about 50 to about 500; and V is a tetravalent linker without limitation, as long as the linker does not impede synthesis or use of the polyimide. Suitable linkers include but are not limited to: (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having 1 to about 30 carbon atoms; or combinations thereof. Suitable substitutions and/or linkers include, but are not limited to, ethers, amides, esters, and combinations thereof. Preferred linkers include but are not limited to tetravalent aromatic radicals of formula (II), such as

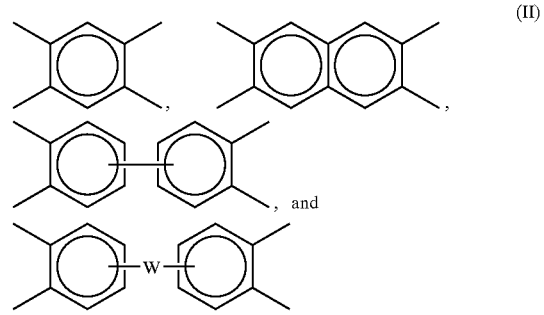

wherein W is a divalent moiety selected from the group consisting of -O-, -S-, -C(O)-, -SO$_2$-, C$_y$H$_{2y}$- (y being an integer from 1 to 5), and halogenated derivatives thereof, including perfluoroalkylene groups, or a group of the formula -O-Z-O- wherein the divalent bonds of the -O- or the -O-Z-O- group are in the 3,3', 3,4', 4,3', or the 4,4' positions, and wherein Z includes, but is not limited, to divalent radicals of formula (III).

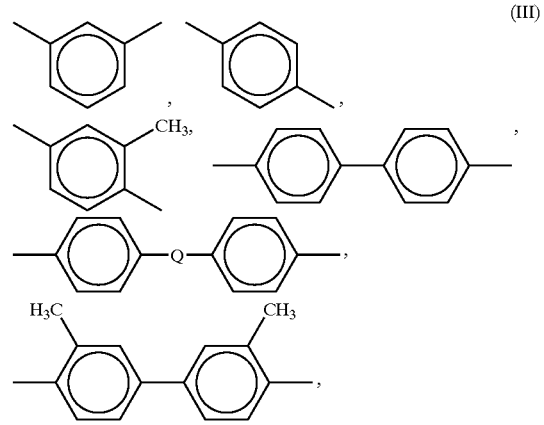

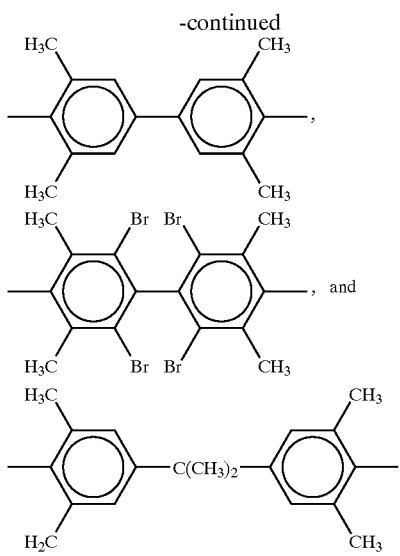

R in formula (I) includes but is not limited to substituted or unsubstituted divalent organic radicals such as: (a) aromatic groups or halogenated, ether, sulfo, sulfone or carbonyl derivatives thereof; (b) straight or branched chain alkylene radicals having about 2 to about 20 carbon atoms; (c) cycloalkylene radicals having about 3 to about 20 carbon atoms, or (d) divatent radicals of the general formula (IV)

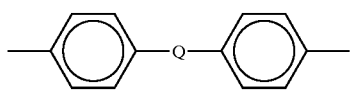

(IV)

wherein Q includes but is not limited to a divalent moiety selected from the group consisting of -O-, -S-, -C(O)-, -SO$_2$-, C$_y$H$_{2y}$- (y being an integer from 1 to 5), and halogenated derivatives thereof, including perfluoroalkylene groups.

Preferred classes of polyimide polymers include polyamide imide polymers and polyetherimide polymers, particularly those polyetherimide polymers known in the art which are melt processable, such as those whose preparation and properties are described in U.S. Pat. Nos. 3,803,085 and 3,905,942.

Preferred polyetherimide resins comprise more than 10, typically about 10 to about 1000 or more, and more preferably about 50 to about 500 structural units, of the formula (V)

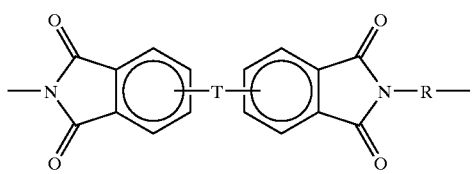

(V)

wherein T is -O- or a group of the formula -O-Z-O- wherein the divalent bonds of the -O- or the -O-Z-O- group are in the 3,3', 3,4', 4,3', or the 4,4' positions; and wherein Z includes, but is not limited to, divalent radicals of formula (III) as defined above.

In one embodiment, the polyetherimide may be a copolymer which, in addition to the etherimide units described above, further contains polyimide structural units of the formula (VI)

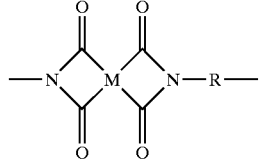

(VI)

wherein R is as previously defined for formula (I) and M includes, but is not limited to, radicals of formula (VII).

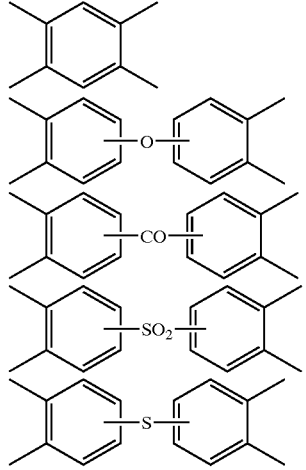

(VII)

The polyetherimide can be prepared by any of the methods known to those skilled in the art, including the reaction of an aromatic bis-ether anhydride of the formula (VIII)

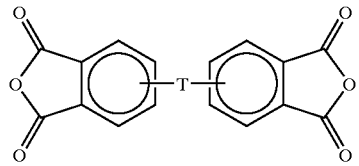

(VIII)

with an organic diamine of the formula (IX)

$$H_2N-R-NH_2 \qquad (IX)$$

wherein T and R are defined as described above in formulas (I) and (IV).

Included among the many methods of making the polyimides, particularly polyetherimide polymers, are those disclosed in U. S. Pat. Nos. 3,847,867, 3,814,869, 3,850, 885, 3,852,242, 3,855,178, 3,983,093, and 4,443,591. These patents are provided for the purpose of teaching, by way of illustration, general and specific methods for preparing polyimides.

Examples of specific aromatic bis- anhydrides and organic diamines are disclosed, for example, in U.S. Pat. Nos. 3,972,902 and 4,455,410.

Illustrative examples of thermoplastic polyimides of the invention can be derived from reaction of aromatic dianhydrides or aromatic tetracarboxylic acids or their derivatives capable of forming cyclic anhydrides and aromatic diamines, or chemically equivalent derivatives, to form cyclic imide linkages.

Illustrative examples of aromatic bis anhydrides include: 2,2-bis(4-(3,4-dicarboxyphenoxy)phenyl)propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis([4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; -4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures thereof.

Most preferred dianhydrides are bisphenol-A dianhydride, benzophenone dianhydride, pyromellitic dianhydride, biphenylene dianhydride and oxy dianhydride.

Suitable aromatic organic diamines include, for example: m-phenylenediamine; p-phenylenediamine; 4,4'-diaminodiphenylpropane, 4,4'-diaminodiphenylmethane (commonly named 4,4'-methylenedianiline); 4,4'-diaminodiphenyl sulfide; 4,4'-diaminodiphenyl sulfone; 4,4'-diaminodiphenyl ether (commonly named 4,4'-oxydianiline); 1,5-diaminonaphthalene; 3,3-dimethylbenzidine; 3,3dimethoxybenzidine; 2,4-bis(beta-amino-t-butyl)toluene; bis(p-beta-amino-t-butylphenyl) ether; bis(p-beta-methyl-o-aminophenyl)benzene; 1,3diamino-4-isopropylbenzene; 1,2-bis(3-aminopropoxy) ethane; benzidine; m-xylenediamine; and mixtures of such diamines.

The most preferred diamines are meta and para phenylene diamines, diamino phenyl sulfones and oxydianiline. The most preferred polyimide resins are the polyetherimides.

Generally useful polyimide resins have an intrinsic viscosity greater than about 0.2 deciliters per gram, preferably of from about 0.35 to about 1.0 deciliters per gram measured in chloroform or m-cresol at 25° C.

In a preferred embodiment, the amorphous polyimide resins of the present invention resin will have a weight average molecular weight of from about 10,000 to about 75,000 grams per mole ("g/mol"), more preferably from about 10,000 to about 65,000 g/mol, even more preferably from about 10,000 to about 55,000 g/mol, as measured by gel permeation chromatography, using a polystyrene standard.

Preferred polyetherimides are sold commercially by General Electric Plastics under the ULTEM® trade name.

Use of mixtures of polyimides having the same structure but different molecular weights may be useful to control melt properties such as melt flow index. Mixtures of chemically different polyimides are also included in the scope of this invention.

The polyamide component of the resin blend comprises a thermoplastic polyamide. Useful polyamide resins include all known polyamides and include polyamide, polyamide-6,6, polyamide-1 1, polyamide-12, polyamide-4,6, polyamide-6,10 and polyamide-6,12, as well as polyamides prepared from terephthalic acid and/or isophthalic acid and trimethylhexamethylenediamine; from adipic acid and m-xylenediamines; from adipic acid, azelaic acid, 2,2-bis-(p-aminocyclohexyl) propane, and from terephthalic acid and 4,4'-diaminodicyclohexylmethane. Mixtures and/or copolymers of two or more of the foregoing polyamides or prepolymers thereof, respectively, are also within the scope of the present invention.

Furthermore, the polyamides may be made by many known methods, including the polymerization of a monoamino monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above, together with substantially equimolar proportions of a diamine and a dicarboxylic acid. The dicarboxylic acid may be used in the form of a functional derivative thereof, for example, a salt, an ester or acid chloride.

Useful examples of the polyamides or nylons, as these are often called, include for example: polypyrrolidone (nylon 4), polycaprolactam (nylon 6), polycaprolactam (nylon 8), polyhexamethylene adipamide (nylon 6,6), polyundecanolactam (nylon 11), polyundecanolactam (nylon 12), polyhexamethylene azelaiamide (nylon 6,9), polyhexamethylene, sebacamide (nylon 6,10), polyhexamethylene isophthalimide (nylon 6,1), polyhexamethylene terephthalamide (nylon 6,T), olyamide of hexamethylene diamine and n-dodecanedioic acid (nylon 6,12) as well as polyamides resulting from terephthalic acid and/or isophthalic acid and trimethyl hexamethylene diamine, polyamides resulting from adipic acid and meta xylenediamines, polyamides resulting from adipic acid, azelaic acid and 2,2-bis-(p-aminocyclohexyl)propane and polyamides resulting from terephthalic acid and 4,4'-diaminodicyclohexylmethane.

Copolymers of the foregoing polyamides or prepolymers thereof are also suitable for use in the practice of the present invention. Such co polyamides include copolymers of the following: hexamethylene adipamide/caprolactam (nylon 6,6/6), hexamethylene adipamide/hexa-methylene-isophthalamide (nylon 6,6/6,1), hexamethylene adipamide/hexa-methylene-terephthalamide (nylon 6,616,T) and hexamethylene adipamide/hexa-methyleneazelaiamide (nylon 6,6/6,9).

Mixtures and/or copolymers of two or more of the foregoing polyamides or prepolymers thereof, respectively, are also within the scope of the present invention.

Preferred polyamides are the polyamides 6,6: 6: 11; 12; 4,6, and 6,6/T. Crystalline polyamides with a melting point, as determined by differential scanning calorimetry (DSC) of greater than or equal to about 170° C. are most preferred.

Olefin copolymers of the invention are comprised of repeat units derived from an olefin, an alpha-beta unsaturated carboxylic acid and optionally an alpha-beta unsaturated carboxylic acid ester wherein all or a portion of the carboxylic acid groups have been neutralized with zinc to form a zinc carboxylic acid moiety. A preferred rubbery olefin copolymer containing zinc carboxylate moieties is illustrated by formula (X):

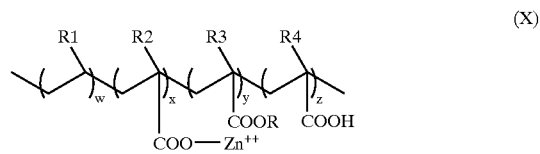

(X)

wherein R1, R2, R3, R4 are hydrogen or $C_1$–$C_{20}$ alkyl. R=$C_1$–C20 alkyl, w+x+y+z=100 mole%, w=50–99 mole %, x=1–50 mole %, y=0–30 mole %, z=0–30 mole %. More preferred olefin copolymers have R1=hydrogen, R2, R3, R4 =methyl, R $C_1$–C20 alkyl, w=80–95, x 5–15, y=0–15, z=0–15.

Such rubbery olefinic resins containing metal carboxylate moieties are often referred to as ionomer resins. They may contain various metal carboxylic units, usually salts of alkaline or alkaline earth metals. Ionomer resins containing zinc salts are also commercially available. These resins are sold by various manufacturers including E. I. du Pontde Nemours and Company which markets them under the SURLYN trademark. Carboxylate ionomers are made in a range of compositions and molecular weights.

In a preferred embodiment, the melt index, as measured according to ASTM D-1238, of the olefinic resins containing metal carboxylate moieties is from 0.1 to 100 grams/10 minutes and preferably from 0.5 to 30 grams/10 minutes.

Suitable olefinic resins containing zinc carboxylate moieties are copolymers that comprise repeating units derived from two or more monomers. As used herein, the terminology "zinc carboxylate" means a zinc salt or partial salt derived from an ethylenically unsaturated carboxylic acid. such as, e.g., acrylic acid, methacrylic acid or itaconic acid.

In another embodiment, the olefinic resins containing zinc carboxylate moieties comprises first repeating units derived one or more zinc neutralized carboxylates and second repeating units derived from one or more alpha-olefin monomers, e.g., ethylene, propylene, 1-butene, 1-pentene.

Suitable olefinic copolymers containing zinc carboxylate moieties may, optionally, contain a minor amount, i.e., up to about 30 wt %, of repeating units derived from one or more other monoethylenically unsaturated copolymerizable monomers. As used herein "monoethylenically unsaturated" means having a single site of ethylenic unsaturation per molecule. Suitable copolymerizable monoethylenically unsaturated monomers include, e.g. ($C_1$–$C_{20}$) alkyl (meth) acrylates such as, e.g., butyl acrylate, methyl methacrylate, cyclohexyl methacrylate. As used herein, the term "($C_1$–$C_{20}$) alkyl" means a straight, cyclic or branched alkyl group of from 1 to 20 carbon atoms per group, such as e.g., methyl, ethyl, decyl, eicosyl, cyclohexyl and the tern "(meth) acrylate" refers collectively to acrylate compounds and methacrylate compounds.

The preferred olefinic copolymers containing zinc carboxylate moieties of the composition will be essentially free of carbonation double bonds. That is with an olefin carbon-carbon double bond content of less than about 1 mole % In a preferred embodiment, the olefinic copolymers containing zinc carboxylate moieties comprises from 10 to 90 wt %, preferably from 10 to 60 wt %, of zinc carboxylate units. The major components of the present invention, polyimide, polyamide and copolymers containing zinc carboxylate moieties, can vary over a wide range. For example, the polyamide can range from 5–95% by weight, the polyimide resin from p95% weight, and olefinic copolymer containing zinc carboxylate moieties from 1–30% by weight, wherein all weight percentages are based on the weight of the entire composition. The preferred composition of the invention will have polyamide content from about 30–70 wt.%, polyimide content from about 30–70 wt.% and olefinic copolymers containing zinc carboxylate moieties from about 1–25 wt. %, wherein all weight percentages are based on the weight of the entire composition. The compositions may further contain 0–50% by weight of one or more additives selected from the group consisting of fiber glass, milled glass, flaked glass, silica, quartz, titanium dioxide, talc, clay, wollastonite, mica, carbon fibers, and carbon nanotubes based upon the total amount of polyimide, polyamide and copolymers containing zinc carboxylate. moieties.

The preferred polyimide, polyamide and olefinic copolymers containing zinc carboxylate moieties of the blend of the invention will have improved properties. Improvements in heat distortion temperature (HDT) and impact strength are most notable.

The load bearing capability of a resin may be measured by its heat distortion temperature. HDT can be measured by numerous methods including ASTM D648.

HDT measured at 66 psi (0.45 Mpa) is a good indication of a material's ability to carry load at temperature. The compositions of this invention are preferred to have a HDT at 66 psi of greater than or equal to 200° C. as measured on a molded part 15.2×1.27×0.32 cm inch thick according to ASTM D648.

A useful measure of a material's toughness is its Izod impact strength, which can be measured according to ASTM 256. High impact materials are useful in a variety if application particularly enclosures or connectors with snap fit fastenings. The compositions of this invention are preferred to have a notched Izod impact strength, as measured according to ASTM D256 on ⅛ inch (0.32 cm) thick molded parts, of greater than or equal to 1.0 ft-lbs/inch (53.4 J/m). The preferred compositions of the invention will have a reversed notched Izod (RNI) impact strength of greater than or equal to 10 ft-lbs/inch (534 J/m).

The composition of the invention can also be combined with other ingredients such as mineral fillers; for example, talc, clay, mica, barite, wollastonite, silica, milled glass and glass flake. Colorants such as titanium dioxide, zinc sulfide and carbon black; stabilizers such as hindered phenols, aryl phosphates and aryl phosphinates, inorganic halides and thioesters, as well as mold release agents, lubricants, flame retardants, smoke suppressors, anti-drip agents, for instance those based on fluoro polymers, additive to reduce wear and enhance lubricity such as fluoro polymers and molybdenum disultide and ultra violet light stabilizers can also be added to the composition in effective amounts.

The composition of the invention may also be modified with effective amount of carbon fibers and nanotubes, metal fibers, metal powders, conductive carbon, or other additives.

The compositions of the present invention are prepared by mechanically blending the components in conventional mixing equipment, e.g., a single or twin screw extruder, Banbury mixer, or any other conventional melt compounding equipment. A vacuum may also be applied to during the compounding operation to reduce volatile materials in the compositions. The order in which the components of the compositions are mixed is not generally critical and may be readily determined by one of skill in this art.

The compositions of the invention may be formed into shaped articles by a variety of common processes for shaping molten polymers such as, for example, injection molding, compression molding, extrusion and gas assist injection molding. Examples of such articles are electrical connectors, enclosures for electrical equipment, automotive engine parts, lighting sockets and reflectors, electric motor parts, power distribution equipment, communication equipment and the like including devices that have molded in snap fit connectors.

The compositions of the invention can also be extruded or blown into sheet, film, or articles.

Further understanding of the present invention may be had from the following examples and comparative examples which are intended to illustrate, but not limit, the invention. All cited references are hereby incorporated herein in their entirety.

EXAMPLES OF THE INVENTION

All ingredients were mixed together on a paint shaker for about 3 minutes and extruded on a 2.5 in. vacuum vented single screw extruder. Temperature was set at about 300° C. screw speed was 80 rpm. The extrudate was cooled, chopped and dried. The resin mixtures were molded into test parts on a 150 ton molding machine set at about 300° C. with a 30 second molding cycle. Molded parts were tested according appropriate ASTM methods. All tests were done on ⅛ inch (0.32 cm) thick samples.

PEIS resin is poly ether imide sulfone made by polymerization of diamino diphenyl sulfone with bisphenol A dianhydride (BPA-DA), Mw was 34,000.

PEI resin is a poly ether imide made by reaction of BPA-DA with m-phenylene diamine, Mw=30,000, obtained from GE Plastics as ULTEM 1010. The zinc ionomer is a copolymer of ethylene, alkyl acrylate and methacrylic acid wherein the acid residues have be neutralized, or partially neutralized by zinc. It is believed to have about 10% neutralized acid content. This copolymer was obtained from E. I. du Pont de Nemours and Company as SURLYN 9020. The corresponding sodium ionomer is believed to be the same copolymer of ethylene, alkyl acrylate and methacrylic acid wherein the acid functionality have been neutralized or partially neutralized with sodium to make the sodium salt. This copolymer was obtained from E. I. du Pont de Nemours and Company as SURLYN 8020.

Table 1 shows the use of the olefinic copolymers containing zinc carboxylate moieties (zinc ionomer resin) as a modifier for a blend containing Nylon 6,6 (VYDYNE 21 obtained from Solutia Inc.) with PEIS resin. Control example A shows the blend with no modifier has a low notched Izod (NI) and low reversed notched Izod (RNI) values; 37 J/m and 374 J/mn. Addition of 5, 10 or 15% of the zinc ionomer resin to the blends improved NI by 70–228%. RNI is more than tripled even with as little as 5% zinc ionomer. (Examples 1, 2 & 3).

Surprisingly use of the sodium ionomer resin in the same blend at 10% shows no improvement of NI or RNI (compare example of the invention 2 to control examples A and B).

Table 1 also shows the improvement in biaxial impact (total energy, TE) achieved by the use of the zinc ionomer resin compared to the same blend with no modifier or the same blend using the sodium ionomer resin. Example 3 with 15% zinc ionomer resin has the best biaxial impact of the blends tested. Biaxial impact was tested by dropping a weight on a 4×⅛ inch molded disc and measuring the total energy absorbed.

Note that all blends retain good 66 psi (0.45 Mpa) heat resistance, with 66 psi HDT above 200° C.

TABLE 1

| PEIS: PA Blends | | | | | |
|---|---|---|---|---|---|
| | A | 1 | 2 | 3 | B |
| PEIS | 60 | 55 | 50 | 45 | 50 |
| PA 6,6 | 40 | 40 | 40 | 40 | 40 |
| Zinc Ionomer | 0 | 5 | 10 | 15 | 0 |
| Sodium Ionomer | 0 | 0 | 0 | 0 | 10 |
| HDT 66 psi ⅛ in. (0.32 cm) ° C. | 217 | 215 | 212 | 213 | 216 |
| Biaxial Impact Total Energy J | 2.4 | 4.5 | 4.2 | 25.5 | 3.3 |
| notched Izod J/m. | 37 | 64 | 91 | 123 | 27 |
| reverse notched Izod J/m. | 374 | 1282 | 1869 | 1655 | 214 |
| Flex Mod MPa | 2995 | 2650 | 2312 | 2077 | 2291 |
| Flex Str. MPai | 126 | 111 | 95 | 85 | 92 |

TABLE 1-continued

| PEIS: PA Blends | | | | | |
|---|---|---|---|---|---|
| | A | 1 | 2 | 3 | B |
| T. Str. MPa @ Yield | 67 | 70 | 61 | 57 | 54 |
| T. Mod MPa | 3340 | 3098 | 2705 | 2374 | 2119 |

Blends of PEI resin with nylon 6,6 show the utility of the zinc ionomer resin in improving properties. Table 2 shows NI and biaxial impact energy more than doubled by addition of 10% of the zinc ionomer resin to the PI/PA blend. (Compare control example C to example of the invention 4)

TABLE 2

| PI/PA Blends | | |
|---|---|---|
| | C | 4 |
| PEI | 60 | 50 |
| PA 6,6 | 40 | 40 |
| Zinc Ionomer | 0 | 10 |
| HDT 66 psi ⅛ in. (0.32 cm) ° C. | 200 | 215 |
| Biaxial Impact Total Energy J | 3.5 | 33.6 |
| notched Izod J/m | 1.0 | 2.4 |
| Revere notched Izod J/m. | 37 | 40 |
| Flex Mod MPa | 2995 | 25053 |
| Flex Str. MPa | 128 | 103 |
| T. Str. MPa @ Yield | 83 | 68 |
| T. Mod. MPa | 3409 | 2781 |

What is claimed:

1. A thermoplastic composition consisting of:
   a) 5–95% by weight of one or more aromatic polyimide resins;
   b) 5–95% by weight of one or more polyamide resins;
   c) 1–30% by weight of one or more olefinic resins comprising repeat units derived from an olefin, an alpha-beta unsaturated carboxylic acid and optionally an alpha-beta unsaturated carboxylic acid ester wherein all or a portion of the carboxylic acid groups have been neutralized with zinc to form a zinc carboxylate, and further wherein the weight percentages of components a, b, and c are based on the total amount of components a, b, c; and
   d) 0–50% by weight of one or more additives selected from the group consisting of fiber glass, milled glass, flaked glass, silica, quartz, titanium dioxide, talc, clay, wollastonite, mica, carbon fibers, and carbon nanotubes based upon the total amount of components a, b, and c.

2. The thermoplastic composition of claim 1, wherein the composition has a notched Izod impact strength as measured by ASTM method D256 of greater than or equal to about 53.4 J/m.

3. The thermoplastic composition of claim 1, wherein the composition has a HDT measured at 66 psi (0.45 MPa) by ASTM method D648 of greater than or equal to about 200° C.

4. The thermoplastic composition of claim 1, wherein the polyimide is a polyetherimide.

5. The thermoplastic composition of claim 4, wherein the polyetherimide is comprised of a reaction product of bisphenol A dianhydride with an aromatic diamine.

6. The thermoplastic composition of claim 1, wherein the polyamide is a crystalline resin having a crystalline melting point greater than or equal to about 170° C.

7. The thermoplastic composition of claim 6, wherein the polyamide is at least one of polyamide 6,6 polyamide 6, polyamide 4,6, polyterephthalamide, polyamide 6,6/T polyamide 11 or polyamide 12.

8. The thermoplastic composition of claim 1, wherein the olefinic resin containing zinc carboxylate moieties has the following formula:

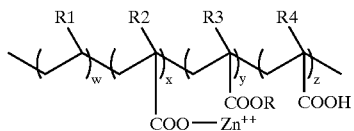

wherein R1, R2, R3, R4, are hydrogen or $C_1$–$C_{20}$ alkyl, R=$C_1$–$C_{20}$ alkyl, w+x+y+z=100 mole %, w=50–99 mole %, x=1–50 mole %, z=0–30 mole %.

9. The thermoplastic composition of claim 1, wherein component a ranges from 30 to 70% by weight, component b ranges from 30 to 70% by weight, and component c ranges from 1 to 25% by weight.

10. An article made form the composition of claim 1.

* * * * *